United States Patent
Luty

(10) Patent No.: US 9,621,424 B2
(45) Date of Patent: Apr. 11, 2017

(54) PROVIDING A COMMON INTERFACE FOR ACCESSING AND PRESENTING COMPONENT CONFIGURATION SETTINGS

(71) Applicant: Microsoft Technology Licensing, LLC, Redmond, WA (US)

(72) Inventor: Andrew Rikyu Luty, Redmond, WA (US)

(73) Assignee: Microsoft Technologies Licensing, LLC, Redmond, WA (US)

( * ) Notice: Subject to any disclaimer, the term of this patent is extended or adjusted under 35 U.S.C. 154(b) by 253 days.

(21) Appl. No.: 14/046,683

(22) Filed: Oct. 4, 2013

(65) Prior Publication Data
US 2015/0100888 A1 Apr. 9, 2015

(51) Int. Cl.
*H04L 12/24* (2006.01)

(52) U.S. Cl.
CPC ........ *H04L 41/0853* (2013.01); *H04L 41/022* (2013.01); *H04L 41/0816* (2013.01); *H04L 41/22* (2013.01)

(58) Field of Classification Search
CPC ............. H04L 41/0813; H04L 41/0853; G06F 9/44505
USPC ........................................................ 715/735
See application file for complete search history.

(56) References Cited

U.S. PATENT DOCUMENTS

| | | | |
|---|---|---|---|
| 5,524,253 A | 6/1996 | Pham et al. | |
| 5,760,770 A | 6/1998 | Bliss et al. | |
| 5,809,329 A | 9/1998 | Lichtman et al. | |
| 5,960,200 A | 9/1999 | Eager et al. | |
| 6,269,480 B1 | 7/2001 | Curtis | |
| 6,332,219 B1 | 12/2001 | Curtis et al. | |
| 6,374,401 B1 | 4/2002 | Curtis | |
| 6,418,468 B1 | 7/2002 | Ahlstrom et al. | |
| 6,446,255 B1 | 9/2002 | Curtis et al. | |

(Continued)

OTHER PUBLICATIONS

Gold, Mike, "Creating a Dynamic Configuration Dialog in C# and .NET", Published on: Jul. 10, 2005, Available at: http://www.c-sharpcorner.com/UploadFile/mgold/DynamicConfigDialog07102005220807PM/Dynamic-ConfigDialog.aspx.

(Continued)

*Primary Examiner* — Matt Kim
*Assistant Examiner* — David Luu
(74) *Attorney, Agent, or Firm* — Workman Nydegger

(57) ABSTRACT

Embodiments are directed to accessing configuration settings for a variety of different hardware or software components and to providing a common interface for accessing and presenting component configuration settings. In one scenario, a computer system receives a request to access configuration settings for hardware and/or software components. The request specifies at least one namespace for the corresponding hardware or software component. The computer system accesses a directory to determine which configuration settings are available for the specified namespace, and further accesses configuration metadata to determine where the configuration settings for the hardware or software components are stored and how the configuration settings are to be accessed. Then, upon determining where the configuration settings are stored and how the configuration settings are to be accessed, the computer system accesses the configuration settings at the specified location in the manner specified in the configuration metadata.

24 Claims, 4 Drawing Sheets

(56) References Cited

U.S. PATENT DOCUMENTS

| | | |
|---|---|---|
| 6,470,454 B1 | 10/2002 | Challener et al. |
| 6,490,677 B1 | 12/2002 | Aguilar et al. |
| 6,536,040 B1 | 3/2003 | Curtis |
| 6,601,174 B1 | 7/2003 | Cromer et al. |
| 6,615,277 B1 | 9/2003 | Curtis |
| 6,629,316 B1 | 9/2003 | Curtis |
| 6,698,018 B1 | 2/2004 | Zimniewicz et al. |
| 6,964,034 B1 | 11/2005 | Snow |
| 7,415,509 B1 | 8/2008 | Kaltenmark et al. |
| 2001/0047279 A1 | 11/2001 | Gargone |
| 2002/0100017 A1 | 7/2002 | Grier et al. |
| 2002/0129356 A1 | 9/2002 | Hellerstein et al. |
| 2002/0147972 A1 | 10/2002 | Olmeda et al. |
| 2002/0169738 A1 | 11/2002 | Giel |
| 2002/0188701 A1 | 12/2002 | Brown et al. |
| 2003/0105838 A1 | 6/2003 | Presley |
| 2003/0159138 A1 | 8/2003 | Curtis |
| 2004/0049509 A1 | 3/2004 | Keller et al. |
| 2004/0083479 A1 | 4/2004 | Bondarenko |
| 2005/0015761 A1 | 1/2005 | Chang et al. |
| 2005/0091346 A1 | 4/2005 | Krishnaswami et al. |
| 2006/0037011 A1 | 2/2006 | Shi et al. |
| 2006/0059530 A1* | 3/2006 | Spielman ............. H04L 41/082 725/132 |
| 2008/0005380 A1* | 1/2008 | Kawasaki ........... G06F 11/1458 710/15 |
| 2008/0059941 A1* | 3/2008 | Payne et al. ................. 717/100 |
| 2008/0168152 A1* | 7/2008 | Weizman .......... G06F 17/30126 709/213 |
| 2008/0244611 A1 | 10/2008 | Doyle et al. |
| 2008/0281969 A1 | 11/2008 | Horton |
| 2010/0131618 A1* | 5/2010 | Brewis ............... H04L 41/0806 709/220 |
| 2011/0247074 A1* | 10/2011 | Manring et al. ................ 726/26 |
| 2012/0144383 A1* | 6/2012 | Mishra et al. ................ 717/173 |
| 2012/0296944 A1* | 11/2012 | Thelen ........................ 707/822 |
| 2014/0122542 A1* | 5/2014 | Barnes ............. G06F 17/30126 707/822 |

OTHER PUBLICATIONS

"asp.net Configuration API Overview", Retrieved on: Sep. 5, 2013, Available at: http://msdn.microsoft.com/en-us/library/ms228060(v=vs.85).aspx/css.

"Edit Settings for Pages and Controls (IIS 7)", Published on: Feb. 19, 2011, Available at: http://technet.microsoft.com/en-us/library/cc772381(v=ws.10).aspx.

McPeak, Jeremy, "How to Add Custom Configuration Settings for an (ASP).NET Application", Published on: Nov. 24, 2012, Available at: http://net.tutsplus.com/tutorials/asp-net/how-to-add-custom-configuration-settings-for-your-asp-net-application/.

Joshi, Vishal, "Web Deployment: Web.Config Transformation", Published on: Mar. 24, 2009, Available at: http://vishaljoshi.blogspot.in/2009/03/web-deployment-webconfig-transformation_23.html.

"View a List of Application Settings (IIS 7)", Retrieved on: Sep. 3, 2013, Available at: http://technet.microsoft.com/en-us/library/cc755233(v=ws.10).aspx.

"Edit an Application Setting (IIS 7)", Retrieved on: Sep. 3, 2013, Available at: http://technet.microsoft.com/en-us/library/cc755164(v=ws.10).aspx.

International Search Report and Written Opinion for PCT Patent Application No. PCT/US04/24041, dated Jul. 15, 2008, 12 pages.

"Access Control List" http://en.wikipedia.org/wiki/Access_control_list, printed on Oct. 1, 2007.

Namespaces in XML, World Wide Web Consortium, Jan. 14, 1999.

SML Schema part 1: Structures, W3C Recommendation, May 2, 2001.

Namespaces in XML 1.1, W3C Candidate Recommendation, Dec. 18, 2002.

U.S. Appl. No. 10/693,019, Apr. 10, 2007, Office Action.
U.S. Appl. No. 10/693,019, Oct. 10, 2007, Final Office Action.
U.S. Appl. No. 10/693,019, Oct. 29, 2008, Office Action.
U.S. Appl. No. 10/693,019, May 13, 2009, Final Office Action.
U.S. Appl. No. 10/693,019, Oct. 9, 2009, Office Action.
U.S. Appl. No. 10/693,019, Apr. 22, 2010, Final Office Action.

* cited by examiner

PS C:\Windows\system32> Get-MgmtSvcSetting – Namespace WebAppGallery
                                     410

Namespace: WebAppGallery ~401

| 402  | 403         | 404   | 405         |
|------|-------------|-------|-------------|
| Name | SettingType | Value | Description |
| CatalogConnectionString | ConnectionString | Data Source=aluty-dev;Initial C... | SQL connection string to catalo... |
| Configured | bool | Ture | Indicates whether the initializ... |
| CatalogUpdateIntervalMinutes | int | 10 | Catalog update interval in minu... |
| OfficialWebPIFeedUrl | Uri | http://go.microsoft.com/?linkid... | Url of Web Platform Installer. |

PS C:\Windows\system32> Set-MgmtSvcSetting – Namespace WebAppGallery – Name CatalogUpdateIntervalMinutes – Value 12

PS C:\Windows\system32> Set-MgmtSvcSetting – Namespace WebAppGallery – Name CatalogUpdateIntervalMinutes | Format-List

Namespace    : WebAppGallery
Name         : CatalogUpdateIntervalMinutes
Value        : 12
SettingType  : int
DefaultValue : 10
Description  : Catalog update interval in minutes.
Error        :

*Figure 4*

PROVIDING A COMMON INTERFACE FOR ACCESSING AND PRESENTING COMPONENT CONFIGURATION SETTINGS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks. For instance, software applications may be designed to provide business suite functionality such as word processing, email, spreadsheets or other functionality. The software runs on hardware components. Each software application and each hardware component may have its own set of configuration settings. These configuration settings allow users to configure how the software and/or hardware components operate.

BRIEF SUMMARY

Embodiments described herein are directed to accessing configuration settings for a variety of different hardware or software components and to providing a common interface for accessing and presenting component configuration settings. In one embodiment, a computer system receives a request to access configuration settings for hardware and/or software components. The request specifies at least one namespace for the corresponding hardware or software component. The computer system accesses a directory to determine which configuration settings are available for the specified namespace, and further accesses configuration metadata to determine where the configuration settings for the hardware or software components are stored and how the configuration settings are to be accessed. Then, upon determining where the configuration settings are stored and how the configuration settings are to be accessed, the computer system accesses the configuration settings at the specified location in the manner specified in the configuration metadata.

In another embodiment, a computer system provides a common interface for accessing and presenting component configuration settings. The computer system establishes an interface that receives user commands and provides access to component configuration settings. The computer system receives, at the established interface, a command to retrieve configuration settings for at least one specified component. The computer system further sends a request to a configuration manager to access the configuration settings for the specified component. The configuration manager is configured to access a directory that specifies which configuration settings are available for the component, and to further access configuration metadata that specifies where the configuration settings are stored and how the configuration settings are accessed. The configuration manager also accesses the configuration settings at the specified location and in the manner specified in the configuration metadata. The computer system then receives the specified configuration settings from the configuration manager and displays the received configuration settings in the established interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 4 illustrates an embodiment in which a common interface for viewing and editing configuration data is provided.

DETAILED DESCRIPTION

Figure 1:
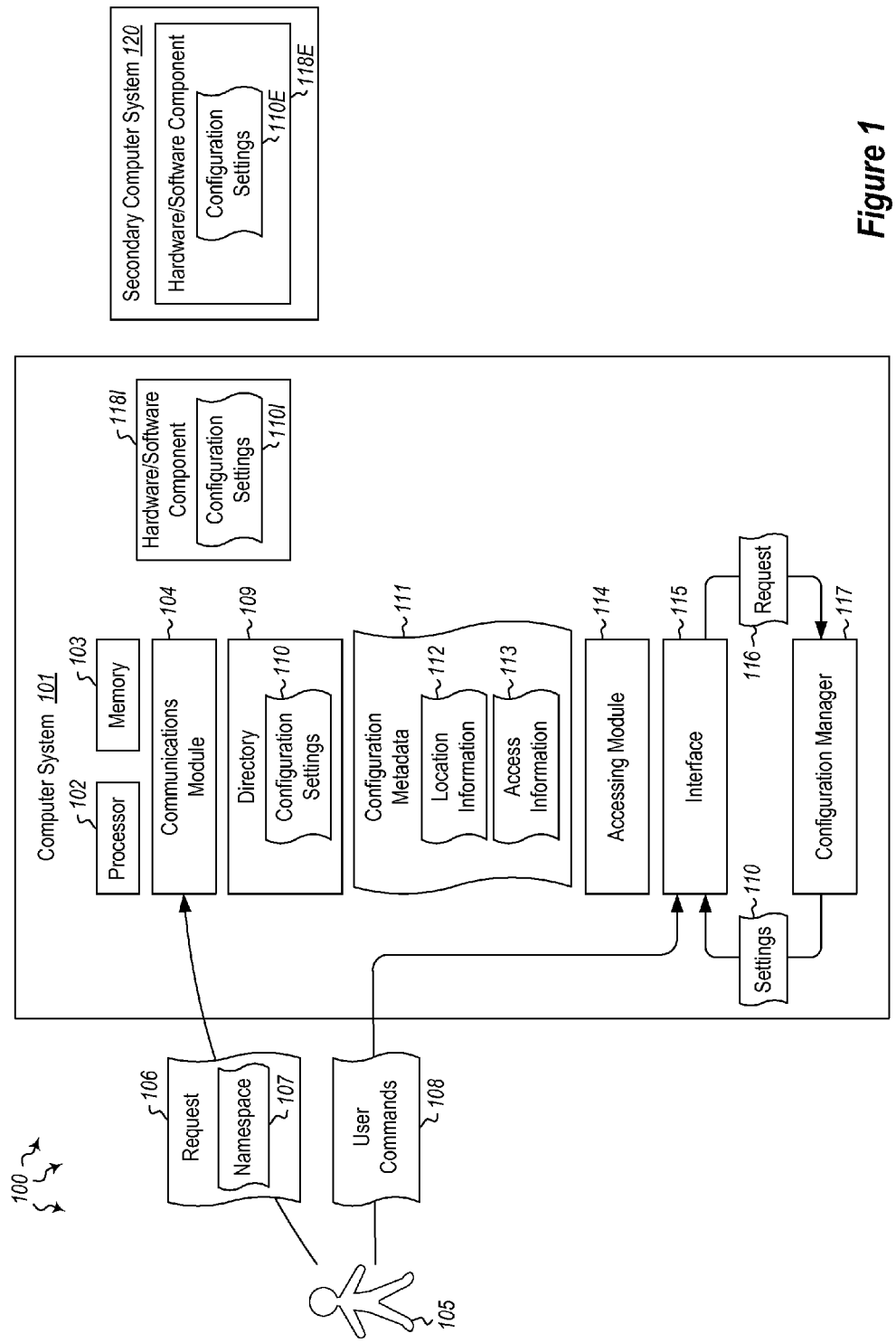
FIG. 1 illustrates a computer architecture in which embodiments described herein may operate including accessing configuration settings for a variety of different hardware or software components.

Embodiments described herein are directed to accessing configuration settings for a variety of different hardware or software components and to providing a common interface for accessing and presenting component configuration settings. In one embodiment, a computer system receives a request to access configuration settings for hardware and/or software components. The request specifies at least one namespace for the corresponding hardware or software component. The computer system accesses a directory to determine which configuration settings are available for the specified namespace, and further accesses configuration metadata to determine where the configuration settings for the hardware or software components are stored and how the configuration settings are to be accessed. Then, upon determining where the configuration settings are stored and how the configuration settings are to be accessed, the computer system accesses the configuration settings at the specified location in the manner specified in the configuration metadata.

In another embodiment, a computer system provides a common interface for accessing and presenting component configuration settings. The computer system establishes an interface that receives user commands and provides access to component configuration settings. The computer system receives, at the established interface, a command to retrieve configuration settings for at least one specified component.

The computer system further sends a request to a configuration manager to access the configuration settings for the specified component. The configuration manager is configured to access a directory that specifies which configuration settings are available for the component, and to further access configuration metadata that specifies where the configuration settings are stored and how the configuration settings are accessed. The configuration manager also accesses the configuration settings at the specified location and in the manner specified in the configuration metadata. The computer system then receives the specified configuration settings from the configuration manager and displays the received configuration settings in the established interface.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, in addition to the processor 102 and memory 103, the computer system 101 includes a communications module 104. The communications module is configured to send and receive data, either via a wired or wireless connection. The communications module 104 may, for instance, receive a data request 106 from a user 105. The user 105 may be any type of computer user including an administrator, an IT specialist, an end user or other type of user.

In some embodiments, the user 105 may wish to access configuration settings for some type of device or application. For instance, the user may desire to access configurations settings 110I for an internal hardware or software component 118I. Additionally or alternatively, the user may want to access configuration settings 110E for a hardware or software component 118E that is external to computer system 101 (e.g. running on secondary computer system 120). It will be understood that the hardware and/or software for which the user desires to access configuration settings may be located substantially anywhere. For instance, the user may wish to adjust or change configuration settings for a router, for a firewall, for a database, for a website, for an application (local or remote) or for any other type of hardware device or component, or software application or function. Because the configuration settings for these disparate hardware devices and software functions may be located on any local or remote computer systems, the user 105 may be unsure as to where the configuration settings are stored, and how the settings are to be accessed.

A directory 109 may be used to store configuration settings 110, links to configuration settings, and/or links to configuration metadata. For instance, the directory 109 may store a mapping or otherwise track the location of configuration settings for a variety of different hardware and/or software components (e.g. 118E and 118I). Additionally or alternatively, the directory may link directly to configuration metadata 111 for each hardware or software component. The configuration settings may include, for example, a "web.config" file for a website or for a web server. The directory 109 may be continually updated whenever changes to the location of the configuration settings occur. Configuration metadata 111 may be added to each stored configuration setting 110. The configuration metadata 111 may include location information 112 and/or access information 113, which describes how configuration settings are to be accessed. Once it has been determined where a specified set of configuration settings is stored, and how those settings are to be accessed, the accessing module 114 accesses those settings.

These settings may then be displayed in an interface 115. The interface may be configured to communicate with a configuration manager 117 to determine how best to display the configuration settings to a user. The interface 115 may be a common interface that allows the user 105 to view and edit many different types of configuration settings, in an organized and normative manner. The interface 115 provides a common viewing and editing experience over disparate configuration settings of various hardware and/or software components. Settings across components may be exposed as (namespace, name, value) tuples, and may be accessed via certain commands including PowerShell cmdlets. Component configuration metadata 111 encapsulates details about where settings are persisted (e.g. xpaths, sprocs), and how the settings are accessed (e.g. in a file, in a database, etc.). The user 105 only needs to be concerned with what name-value pair settings are exposed for viewing and editing. The interface 115 may provide various details about configurable settings like data types, default values, descriptions and associated metadata. The configuration metadata may be extended to provide additional functionality like constraint-based validation of values. Each of the concepts mentioned above will be explained further below with regard to methods 200 and 300 of FIGS. 2 and 3, respectively.

Figure 2:
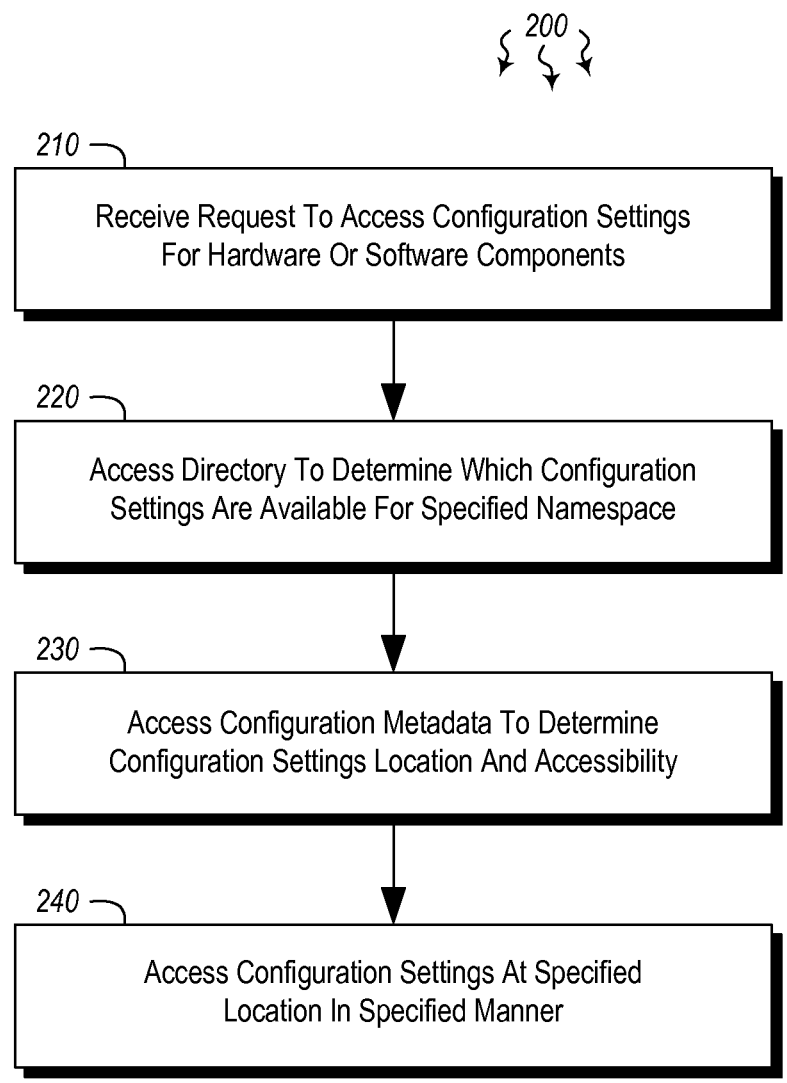
FIG. 2 illustrates a flowchart of an example method for accessing configuration settings for a variety of different hardware or software components.
Figure 3:
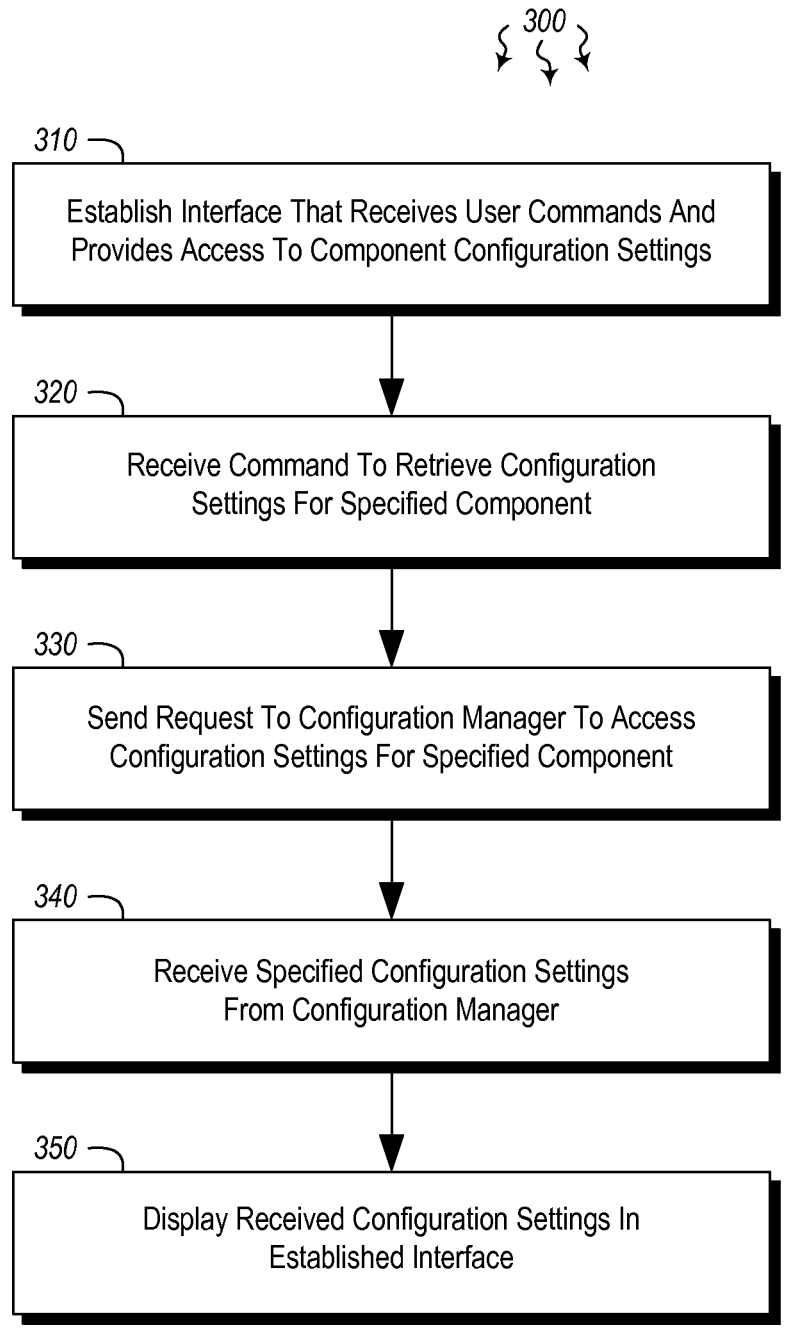
FIG. 3 illustrates a flowchart of an example method for providing a common interface for accessing and presenting component configuration settings.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for accessing configuration settings for a variety of different hardware or software components. The method 200 will now be described with frequent reference to the components and data of environment 100.

Method 200 includes an act of receiving a request to access configuration settings for one or more hardware or software components, the request specifying at least one namespace for the corresponding hardware or software component (act 210). For example, communications module 104 may receive request 106 from user 105 requesting access to configuration settings 110 for various hardware and/or software components 118E/118I. The request includes at least one namespace 107 that identifies which hardware and/or software components' settings are to be accessed. The request may be sent from the computer system 101 or from a remote computer system. The request may originate from an application via a user interface (UI) or from a command prompt.

Upon receiving the request for configuration settings, the computer system 101 accesses a directory to determine which configuration settings are available for the specified namespace (act 220). For instance, the computer system 101 may access directory 109 (which may be local or remote) and determine which configuration settings are available for the namespace 107 specified in the request 106. As mentioned above, the directory may include the configuration settings itself (e.g. the directory may be a database, or may be part of a database or other data store), or may include links to the configuration settings. In cases where the directory maintains links to configuration settings, the directory may maintain a mapping to each of the components' configuration settings. This mapping may be updated automatically if or whenever the configuration settings change locations.

Method 200 next includes an act of accessing one or more portions of configuration metadata to determine where the configuration settings for the hardware or software components are stored and how the configuration settings are to be accessed (act 230). The accessing module 114 may access configuration metadata 111 to determine, from the metadata, where the configuration settings for the specified namespace 107 are stored and how the settings are to be accessed. The configuration metadata 111 may include multiple forms of information including a description of what the settings are, an indication of setting type, a description of values, or other types of data related to the namespace 107.

In some cases, configuration metadata 111 may be added to an existing configuration system. As such, the configuration metadata specifies where the configuration settings for the hardware or software components are stored and how the configuration settings are to be accessed for the existing configuration system. Thus, if a user (e.g. 105) had an existing system with a variety of different hardware and/or software components, the user could add the configuration data to the configuration settings 110 (in directory 109, for example), and then access the configuration settings using the location 112 and access information 113 stored in the added metadata. Still further, as new components (either software or hardware) are added to a system, configuration metadata corresponding to the component may automatically be generated and added to the directory. In this manner, newly added components will also be accessible using the configuration metadata.

In some embodiments, configuration settings 110 may be encoded or encrypted in some manner. For example, if the configuration settings are for a secure application, or secure hardware, or are related to passwords or other sensitive data, the configuration settings may be encrypted to prevent unauthorized access. In such cases, the configuration metadata 111 specifies how the configuration settings are encoded or encrypted. This information may be used by the user 105 to determine how to access the encoded or encrypted configuration settings. In still other cases, the configuration metadata 111 may provide constraints on parameter values (e.g. indicating that the value must be an integer or other specified data type). The constraints may be used to ensure that the proper data type is inputted for a given configuration setting. Constraints may also be used to ensure that a setting value is not out of a specified range, or is valid for a specified setting. In this manner, constraints may be used to ensure that configuration setting data types and values are correct.

In some embodiments, an adapter may be implemented to access the namespace 107 identified by the user 105. For instance, in cases where the configuration metadata 111 is accessible via a path that requires translation (into another format, for example). The adapter may access the specified namespace 107 by translating the configuration metadata 111 to a namespace and one or more name/value pairs. Within the name/value pair, the namespace may be the name of the component, the name may be an alias to a full name of the setting (in cases where the full name is excessively long), and a value. The namespace may group the configuration settings related to a specified hardware or software component into an identified group, and the configuration settings themselves 110 may include the name/value pairs. As such, user commands such as "get" or "set" can use namespace, name and value in the commandlets.

Returning to method 200, upon determining where the configuration settings are stored and how the configuration settings are to be accessed, the accessing module 114 accesses the configuration settings at the specified location in the manner specified in the configuration metadata (act 240). Thus, the accessing module 114 seeks out the configuration settings 110 at the location 112 specified in the configuration metadata, and in the manner 113 specified in the configuration metadata 111. Thus, the configuration metadata corresponding to each configuration setting (or group of settings) can be used to indicate where the settings are located and how to access them. These settings may then be displayed in an interface 115, as will be explained further below. Within this interface, the configuration settings may be edited. For instance, the user 105 may specify edits or changes that are to be performed on the configuration settings. These changes are then updated in real time.

In some cases, the configuration settings 110 may be accessible using raw command lines, where the user specifies the path to the configuration settings (e.g. a file path). If the user does not specify either a namespace or a name for the corresponding hardware or software component, each available hardware or software component setting is returned. If it is determined at least one setting name is beyond a threshold name length, an alias may be generated for the setting name. After the alias has been generated, the configuration setting may be accessed by specifying the alias name from that point on. In some embodiments, the computer system 101 may perform a scan of hardware and/or software local and/or remote components and enumerate the components in some manner. Upon enumeration (e.g. in a list), the computer system 101 may request configuration settings from each enumerated component. If the computer system 101 detects that a hardware or software component is attempting to install itself at the computer system, the computer system can establish a namespace for the detected component in a component directory 109, and further establish configuration metadata 111 that links to configuration settings for the that component.

Turning now to FIG. 3, a flowchart is illustrated which describes a method 300 for providing a common interface for accessing and presenting component configuration settings. The method 300 will now be described with frequent reference to the components and data of environment 100.

Method 300 includes an act of establishing an interface that receives user commands and provides access to component configuration settings (act 310). For example, computer system 101 may generate or otherwise provide interface 115. Interface 115 allows users such as user 105 to access, edit and view configuration settings 110 in a consistent, normalized manner. For instance, hardware settings for a firewall may be much different than software settings for an application. The interface 115 may determine what the configuration settings are for each component, and may determine the best way to present each setting.

The interface 115 may receive a command to retrieve configuration settings for at least one specified component (act 320). The command 108 may come from user 105 or from another user or computer system or application. The command indicates that configuration settings 110 are to be retrieved and presented to the user 105 in interface 115. The interface 115 sends a request 116 to a configuration manager 117 to access the configuration settings for a specified component. The configuration manager 117 is configured to access a directory 109 that specifies which configuration settings 110 are available for the hardware or software component 118E/118I. The configuration manager 117 further accesses configuration metadata 111 that specifies where the configuration settings are stored and how the configuration settings are to be accessed. The configuration manager 117 then accesses the configuration settings 110 at the specified location 112 and in the manner 113 specified in the configuration metadata (act 330). The interface 115 then receives the specified configuration settings 110 from the configuration manager 117 (act 340), and displays the received configuration settings in the interface 115 (act 350).

When the configuration settings are displayed in the interface 115, they are displayed in a consolidated, normative manner. As such, hierarchies are flattened, encoded values are decoded, and encrypted values are decrypted. This consolidated, normative data is then displayed, showing the user 105 the configuration settings for a specified namespace.

As shown in FIG. 4, an interface 400 (which may be the same as or different than interface 115) may show the specified namespace (i.e. the namespace specified in the "get" command at 410), the name 402 of each setting, the setting type 403 for each setting, the value 404 and a corresponding description 405 of the setting for each value. The information may be displayed in a similar manner for hardware and software components alike. The name 402 may be an alias representing the full name of the configuration setting in cases where the prior name was too long, or was changed for other reasons. The interface 400 provides details about the configuration settings including setting type, default (or current) value, and description. These details may be provided by the configuration metadata 111. As such, a hardware or software component provider may specify, for their components, descriptions, values and other data which may be pertinent to their component. This data is then the data that is displayed in the interface 115.

In some embodiments, upon installation of a plug-in component (such as a hardware component or a software component), the plug-in component puts an entry in the directory 109 pointing to its corresponding configuration metadata 111. The configuration settings 110 are then installed on the computer system 101 (or on a remote computer system accessible by computer system 101). The plug-in further supplies configuration metadata 111 that shows where the configuration settings are located. The plug-in component may be a native component, or may be a third party plug-in component. In some cases, the interface 115 may be configured to filter configuration settings 110 using the configuration metadata 111. As described above, the configuration metadata may indicate how to display the configuration settings and which configuration settings to display. The interface 115 may use this data to filter which data is shown for a given namespace. Thus, if a user specifies a certain namespace, and that namespace has certain configuration settings, some or all of those settings may be displayed, as filtered by the interface 115. In this manner, a user may be able to provide a component name or namespace, and then receive component configuration settings for that component, regardless of where the component configuration settings are located for that component.

Accordingly, methods, systems and computer program products are provided which access configuration settings for a variety of different hardware or software components. Moreover, methods, systems and computer program products are provided which provide a common interface for accessing and presenting component configuration settings.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A computer system comprising the following:
one or more processors;
one or more computer-readable storage media having stored thereon computer-executable instructions that are executable by the one or more processors to cause the computer system to perform a method for accessing configuration settings for a variety of different hardware components, the method comprising the following:
   receiving a request to access hardware configuration settings for one or more hardware components, the request including a namespace for each hardware component that is to be accessed;
   after identifying each hardware component that is to be accessed, accessing a directory to determine which hardware configuration settings are available for the identified hardware components, wherein at least one available hardware configuration setting is located remotely to the directory, and wherein the directory includes a direct link to the at least one available hardware configuration setting;

displaying, on a user interface, at least some hardware configuration settings that were determined to be available for the identified hardware components, wherein the user interface at least displays 1) an identifier corresponding to a first available hardware configuration setting and an actual setting value for that first available hardware configuration setting and 2) a different identifier corresponding to one of the at least one available hardware configuration settings that is located remotely and the direct link for that one of the at least one available hardware configuration settings, whereby the actual setting value and the direct link are displayed simultaneously with each other on the user interface;

based on the determination of which hardware configuration settings are available, accessing one or more portions of hardware configuration metadata that correspond to the available hardware configuration settings to determine where the available hardware configuration settings for the identified hardware components are stored and how the available hardware configuration settings are to be accessed; and upon determining where the available hardware configuration settings are stored and how the available hardware configuration settings are to be accessed, accessing the available hardware configuration settings at a location and in a manner that are both specified in the hardware configuration metadata.

2. The computer system of claim 1, wherein the method performed by the computer system further includes:
editing the accessed hardware configuration settings according to one or more specified edits that are to be performed.

3. The computer system of claim 1, wherein an adapter accesses a first namespace in the request by translating the hardware configuration metadata to create a corresponding namespace and one or more name/value pairs.

4. The computer system of claim 3, wherein configuration settings related to a specified hardware component are grouped together, the configuration settings comprising specific name/value pairs.

5. The computer system of claim 1, wherein one or more portions of configuration metadata are added to an existing configuration system, such that the hardware configuration metadata specifies where the available hardware configuration settings for the identified hardware components are stored and how the available hardware configuration settings are to be accessed for the existing configuration system.

6. The computer system of claim 1, wherein a second request is received, the second request not including any namespaces, and wherein the method performed by the computer system further includes:
in response to receiving the second request that does not specify any namespaces, causing each available hardware component to be returned.

7. The computer system of claim 1, wherein the configuration metadata specifies how the configuration settings are encoded or encrypted.

8. The computer system of claim 1, wherein the metadata provides constraints on parameter values, the constraints being usable for constraint verification.

9. The computer system of claim 1, wherein the method performed by the computer system further includes:
enumerating one or more hardware components and one or more software components and requesting configuration settings from each.

10. The computer system of claim 1, wherein the method performed by the computer system further includes:
detecting that a hardware component is attempting to install itself at the computer system;
establishing a namespace for the detected component in a component directory; and
establishing configuration metadata that directly links to one or more configuration settings for the detected hardware component.

11. The computer system of claim 1, wherein a user provides a component name or namespace, and receives component configuration settings, without determining a location of the computer system.

12. A computer system comprising the following:
one or more processors;
one or more computer-readable storage media having stored thereon computer-executable instructions that are executable by the one or more processors to cause the computer system to perform a method for providing a common interface for accessing and presenting component configuration settings, the method comprising the following:
establishing an interface that receives user commands and provides access to component configuration settings stored on a local computer system and a remote computer system;
receiving, at the established interface, a command to retrieve configuration settings for at least one specified component on the local computer system or the remote computer system;
sending a request to a configuration manager to access the configuration settings for the at least one specified component, wherein, in response to the request, the configuration manager 1) accesses a directory that specifies which configuration settings are available for the at least one specified component, the directory, including a direct link to at least one configuration setting that is located remotely to the directory, 2) accesses configuration metadata that specifies where the available configuration settings are stored on the local computer system or the remote computer system for the at least one specified component, and 3) accesses each of the available configuration settings at a corresponding location specified in the configuration metadata;
receiving each of the available configuration settings from the configuration manager; and
displaying the received configuration settings in the established interface, wherein the established interface at least displays 1) an identifier corresponding to a first available configuration setting and an actual setting value for that first available configuration setting and 2) a different identifier corresponding to one of the at least one configuration settings that is located remotely and the direct link for that one of the at least one configuration settings, whereby the actual setting value and the direct link are displayed simultaneously with each other on the established interface.

13. The computer system of claim 12, wherein the established interface also displays a second identifier for a second available configuration setting, and wherein the value of the first available configuration setting and a value of the second available configuration setting are displayed simultaneously with each other and simultaneously with both a description of the first available configuration setting and a description of the second available configuration setting, the description of the first available configuration setting being distinct from, and separate from, information contained within the configuration metadata corresponding to the first available configuration setting, and the description of the second available configuration setting being distinct from, and separate from, information contained within the configuration metadata corresponding to the second available configuration setting.

14. The computer system of claim 13, wherein the established interface comprises a namespace for the at least one specified component and an alias representing a full name for each of the available configuration settings.

15. The computer system of claim 12, wherein the established interface provides one or more details for each of the available configuration settings, the one or more details including at least one of type, default value, and description.

16. The computer system of claim 12, wherein, upon installation of a plug-in component, the plug-in component performs the following:
  puts an entry in the directory, the entry pointing to a corresponding metadata,
  installs corresponding configuration settings, and
  supplies metadata that shows where the newly installed configuration settings are located.

17. The computer system of claim 12, wherein the established interface filters out one or more configuration settings using the configuration metadata which provides an indication of how to display the configuration settings and which configuration settings are available to be displayed.

18. A computer system comprising the following:
  one or more processors;
  system memory;
  one or more computer-readable storage media having stored thereon computer-executable instructions that are executable by the one or more processors to cause the computer system to perform a method for accessing and presenting configuration settings for a variety of different hardware components, the method comprising the following:
    receiving a request to access configuration settings for one or more hardware components, the request including a namespace for each hardware component that is to be accessed;
    after identifying which hardware components are to be accessed, accessing a directory to determine which configuration settings are available for the identified hardware components, wherein at least one available configuration setting is located remotely to the directory such that the directory includes a direct link to the at least one available configuration setting, and wherein a different configuration setting that is not located remotely is also included within the directory;
    displaying, on a user interface, at least some configuration settings that were determined to be available for the identified hardware components, wherein the user interface at least displays 1) an identifier corresponding to a first available configuration setting and an actual setting value for that first available configuration setting and 2) a different identifier corresponding to one of the at least one available configuration settings that is located remotely and the direct link for that one of the at least one configuration settings, whereby the actual setting value and the direct link are displayed simultaneously with each other on the user interface;
    accessing one or more portions of configuration metadata to determine how the configuration settings are to be accessed; and
    upon determining how the configuration settings are to be accessed, accessing the configuration settings in a manner specified in the configuration metadata.

19. The computer system of claim 1, wherein the method performed by the computer system further includes the following:
  receiving a second request to access software configuration settings for one or more software components, the second request including a namespace for each software component that is to be accessed;
  after identifying which software components are to be accessed, accessing the directory to determine which software configuration settings are available for the identified software components, wherein at least one available software configuration setting is located remotely to the directory such that the directory displays a direct link to the at least one available software configuration setting;
  based on the determination of which software configuration settings are available, accessing one or more portions of software configuration metadata that correspond to the available software configuration settings to determine where the available software configuration settings for the identified software components are stored and how the available software configuration settings are to be accessed; and
  upon determining where the available software configuration settings are stored and how the available software configuration settings are to be accessed, accessing the available software configuration settings at a specified location and in a particular manner specified in the software configuration metadata.

20. The computer system of claim 1, wherein the at least one available configuration setting that is located remotely to the directory is located on a second, different computer system.

21. The computer system of claim 1, wherein the method performed by the computer system further includes:
  determining that an initial location of the at least one available configuration setting that is located remotely to the directory has changed; and
  in response to determining that the initial location has changed, updating the direct link to the at least one available configuration setting that is located remotely to the directory.

22. The computer system of claim 1, wherein the directory also includes a different direct link, the different direct link pointing to a portion of the hardware configuration metadata, whereby the directory includes 1) the direct link that points to the at least one available hardware configuration setting and 2) the different direct link that points to the portion of the hardware configuration metadata.

23. The computer system of claim 1, wherein an adapter accesses at least one namespace included within the request and translates configuration metadata that is associated with the at least one namespace into a first namespace and a first set of name/value pairs, and wherein the first set of name/value pairs is included within an associated hardware configuration setting.

24. The computer system of claim 1, wherein the available hardware configuration settings are accessed via one or more PowerShell cmdlets.

* * * * *